S. BIRNBAUM.
GRAPE FRUIT CORER.
APPLICATION FILED JAN. 4, 1916.
1,182,629.
Patented May 9, 1916.
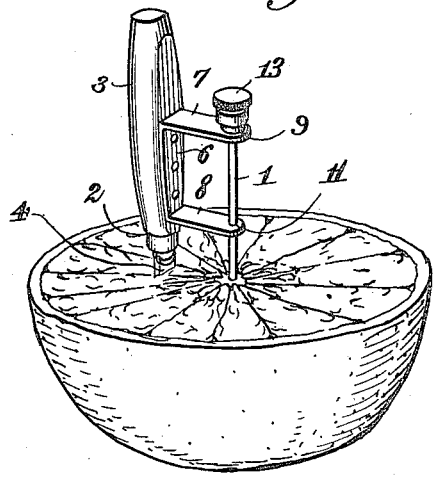
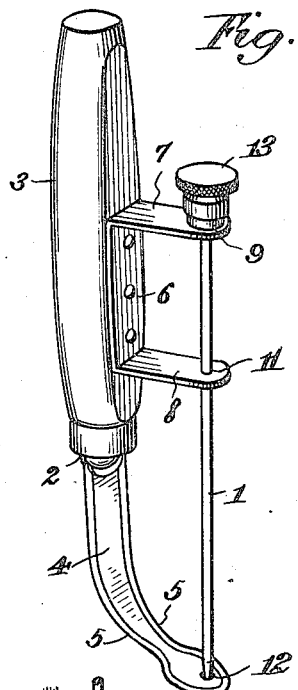
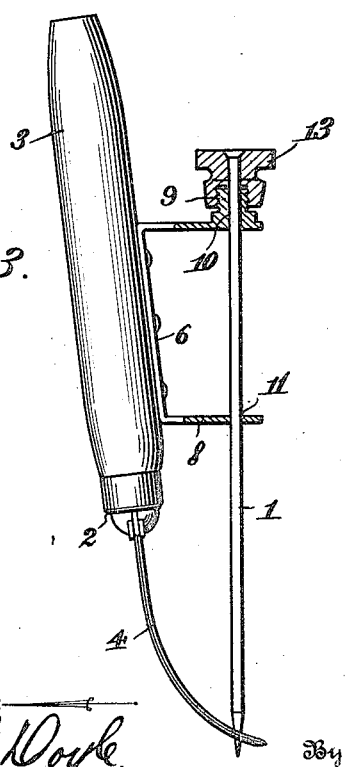
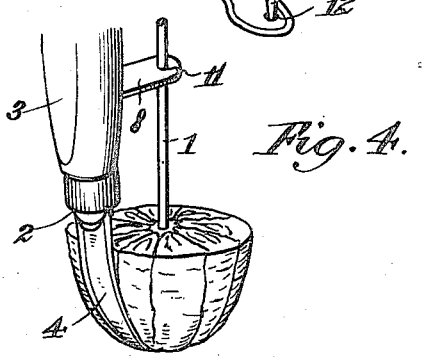
Inventor,
Samuel Birnbaum
By Victor J. Evans,
Attorney
Witnesses:
A. V. Doyle
C. Crimmins

UNITED STATES PATENT OFFICE.

SAMUEL BIRNBAUM, OF NEW YORK, N. Y.

GRAPE-FRUIT CORER.

1,182,629.　　　　　Specification of Letters Patent.　　Patented May 9, 1916.

Application filed January 4, 1916. Serial No. 70,119.

*To all whom it may concern:*

Be it known that I, SAMUEL BIRNBAUM, a citizen of the United States, residing at 2196 Broadway, New York, in the county of New York and State of New York, have invented new and useful Improvements in Grape-Fruit Corers, of which the following is a specification.

This invention relates to grape fruit corers.

An object of the invention is to produce a corer comprising a holding and centering pin and having a knife rotatable therewith, whereby the tough fibrous core may be removed from the fruit so as to leave only the more palatable portion of such fruit.

Another object is to produce a corer, the knife thereof, having a curved blade with two cutting edges. The blade being cut away to provide a curvature in the cutting edges of said blade whereby the core pulp may be more easily removed from the fruit.

Another object is to produce a corer, so that the core, subsequent to the severing thereof from the fruit, may be easily and readily removed without being touched by the hands.

Another object is to produce a corer which is simple of construction and inexpensive of manufacture, and one which will effectively operate for the intended purposes.

With these and other objects in view the invention consists in the novel arrangement of parts and in some parts improvements as will be more readily understood as this specification is read in connection with the accompanying sheet of drawing in which;

Figure 1, is a perspective view of the device showing the same positioned in a half portion of the fruit to be cored preparatory to the removal of the core. Fig. 2, is a similar view of the device removed from the fruit. Fig. 3, is a sectional elevation of the device. Fig. 4, is a fragmentary elevation showing the core held as it is removed from the fruit.

Referring to the drawings the numeral 1, designates the holding and centering pin the function of which will be hereinafter more fully explained. Slidably related to said pin 1, is the knife proper designated by the numeral 2. The knife proper comprises a handle 3, which carries the cutting blade 4. The said blade is curved as clearly shown and is provided with two cutting edges. It is also cut away as at 5, to provide curvatures in the cutting edges, whereby the cutting action of the blade will be more effective.

Attached to the handle 3, is a bracket 6, having upper and lower arms 7 and 8 respectively. The upper arm 7, is provided with a boss 9 having a central bore 10, which alines with an opening 11, in the other arm 8 of said bracket, and also alines with an opening 12 in the free end of the cutting blade 4. The pin 1, is received in the bore 10 and the alining opening 11, in the arm 8 and the opening 12 in the free end of the cutting blade 4.

It will be noticed that the pin is capable of vertical movement for the withdrawal of the pointed end of the pin from the opening 12. This is accomplished by providing the pin 1 with a head designated by the numeral 13, having an internally screw-threaded bore for threading engagement with the boss 9, which is externally screw-threaded. It will also be manifest that the pin may be held against movement.

In practice the pin 1, is withdrawn from engagement with the free end of the blade 4, and the blade is then positioned in the fruit to be cored, after which the pin is centered and the pointed end thereof is brought to enter the opening 12. The pin is next locked in position by threading the head of said pin with the boss 9, after which the core may be removed. The knife is capable of being rotated to cut without regard to the direction in which the knife is moved as will be obvious.

While I have shown and described the preferred embodiment of my invention, it is to be understood to cover all variations within the scope of the invention and claims hereunto appended.

What is claimed as new is:

1. In an article of the class described, comprising a curved cutting-blade having a handle thereon, a centering pin carried by said handle and adapted to be brought into and out of engagement with said blade, and means for holding said centering-pin in engagement with the blade, as and for the purpose specified.

2. In an article of the class described, comprising a curved cutting-blade having a handle theron, the said cutting-blade having a continuous cutting edge; a centering-pin carried by said handle and adapted to be brought into and out of engagement with said blade, and means for holding said centering-pin in engagement with said blade, as and for the purpose specified.

3. In an article of the class described, comprising a curved cutting-blade having a handle thereon, the said cutting-blade having an irregular cutting edge, a centering-pin carried by said handle and adapted to be brought into and out of engagement with said blade, and means for holding said centering-pin in engagement with said blade, as and for the purpose specified.

4. In an article of the class described, comprising a curved cutting-blade having a handle thereon, a bracket attached to said handle; a centering-pin slidably mounted in said bracket; means on said bracket and co-acting means on said centering-pin whereby to hold said centering-pin against sliding movement, as and for the purpose specified.

5. In an article of the class described, consisting of a knife and a curved blade with an irregular continuous cutting edge, and a handle; a bracket attached to said handle; means on the bracket and co-acting means on the centering-pin whereby to cause said knife and centering-pin to become a unit for the severing and taking away of the core from the fruit.

SAMUEL BIRNBAUM.

Witnesses:
   ANNA V. DOYLE,
   C. CRIMMINS.